(12) United States Patent
Meranda et al.

(10) Patent No.: US 11,278,933 B2
(45) Date of Patent: Mar. 22, 2022

(54) SPHERICAL ELASTOMERIC MOUNTS

(71) Applicant: M-I L.L.C., Houston, TX (US)

(72) Inventors: Christopher T. Meranda, Union, KY (US); Marc D. Mayer, Burlington, KY (US)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 0 days.

(21) Appl. No.: 16/619,920

(22) PCT Filed: Jul. 3, 2018

(86) PCT No.: PCT/US2018/040760
§ 371 (c)(1),
(2) Date: Dec. 5, 2019

(87) PCT Pub. No.: WO2019/010208
PCT Pub. Date: Jan. 10, 2019

(65) Prior Publication Data
US 2020/0139405 A1  May 7, 2020

Related U.S. Application Data

(60) Provisional application No. 62/528,952, filed on Jul. 5, 2017.

(51) Int. Cl.
*B07B 1/42* (2006.01)
*B07B 1/28* (2006.01)
(Continued)

(52) U.S. Cl.
CPC .............. *B07B 1/286* (2013.01); *F16C 17/10* (2013.01); *F16C 27/063* (2013.01)

(58) Field of Classification Search
CPC .. B07B 1/286; B07B 1/38; B07B 1/42; B07B 1/44; F16C 17/10; F16C 27/063; F16C 23/043; F16C 17/105
See application file for complete search history.

(56) References Cited

U.S. PATENT DOCUMENTS 3,744,859 A * 7/1973 Ringel ................ F16C 11/0623
                                                      384/206
4,331,367 A * 5/1982 Trudeau ................ F16C 23/045
                                                      384/202
(Continued)

FOREIGN PATENT DOCUMENTS

CN       202087521 U    12/2011
CN       102829078 A    12/2012
(Continued)

OTHER PUBLICATIONS

International Search Report and Written Opinion for the counterpart International patent application PCT/US2018/040760 dated Oct. 25, 2018.
(Continued)

*Primary Examiner* — Patrick H Mackey
(74) *Attorney, Agent, or Firm* — Jeffrey D. Frantz (57) ABSTRACT

An apparatus includes an outer bearing member defining a cavity and an inner bearing member disposed within the cavity. The inner bearing member includes a spherical surface and a rod attachment opening defined in the spherical surface. The apparatus also includes an elastomeric material disposed within the cavity adjacent to the spherical surface.

10 Claims, 8 Drawing Sheets

(51) Int. Cl.
*F16C 17/10* (2006.01)
*F16C 27/06* (2006.01)

(56) References Cited

U.S. PATENT DOCUMENTS

| | | | | |
|---|---|---|---|---|
| 4,447,094 | A * | 5/1984 | Trudeau | F16C 11/0666 |
| | | | | 384/145 |
| 4,718,779 | A * | 1/1988 | Trudeau | F16C 33/74 |
| | | | | 384/152 |
| 4,761,083 | A * | 8/1988 | Smith | F16C 23/045 |
| | | | | 384/208 |
| 5,494,173 | A | 2/1996 | Deister et al. | |
| 5,902,050 | A * | 5/1999 | Balczun | F16C 11/083 |
| | | | | 384/206 |
| 11,009,063 | B2 * | 5/2021 | McGuire | F16C 23/043 |
| 2006/0098908 | A1 * | 5/2006 | Clarke | F16C 27/063 |
| | | | | 384/192 |
| 2007/0019895 | A1 * | 1/2007 | Smith | F16C 27/063 |
| | | | | 384/192 |
| 2012/0074669 | A1 * | 3/2012 | Scharf | B60D 5/00 |
| | | | | 280/515 |
| 2015/0211579 | A1 | 7/2015 | Lawrence et al. | |
| 2015/0240868 | A1 * | 8/2015 | Buesing | F16C 29/02 |
| | | | | 416/134 A |
| 2016/0238069 | A1 * | 8/2016 | Bohm | F16C 23/045 |

FOREIGN PATENT DOCUMENTS

| | | | |
|---|---|---|---|
| CN | 204234338 | U | 4/2015 |
| CN | 204610545 | U | 9/2015 |
| CN | 204842196 | U | 12/2015 |
| CN | 205518585 | U | 8/2016 |
| CN | 106076825 | A | 11/2016 |
| CN | 201150918 | Y | 11/2018 |
| JP | 2008267396 | A | 11/2008 |
| RU | 2104416 | C1 | 2/1998 |
| RU | 2492065 | C2 | 9/2013 |
| RU | 133225 | U1 * | 10/2013 |
| RU | 133225 | U1 | 10/2013 |
| SU | 839606 | A1 | 6/1981 |

OTHER PUBLICATIONS

International Preliminary Report on Patentability for the counterpart International patent application PCT/US2018/040760 dated Jan. 16, 2020.

Extended European Search Report issued in European Patent Appl. No. 18829149.6 dated Apr. 15, 2021; 7 pages.

First Chinese Office Action issued in Chinese Patent Application No. 201880044097.2 dated Dec. 2, 2021, 23 pages with English translation.

* cited by examiner

FIG.1

(PRIOR ART)

SPHERICAL ELASTOMERIC MOUNTS

BACKGROUND

Gyratory sifters use vibrations to sort different sizes of aggregate. One type of gyratory sifter has a screen that is suspended from a platform and uses an eccentric motor to vibrate the screen. Multiple shafts connect the screen to the platform, and each of the shafts has a joint that accommodates the vibrations. These gyratory sifters have a universal joint that connects the shaft to the platform.

Figure 1:
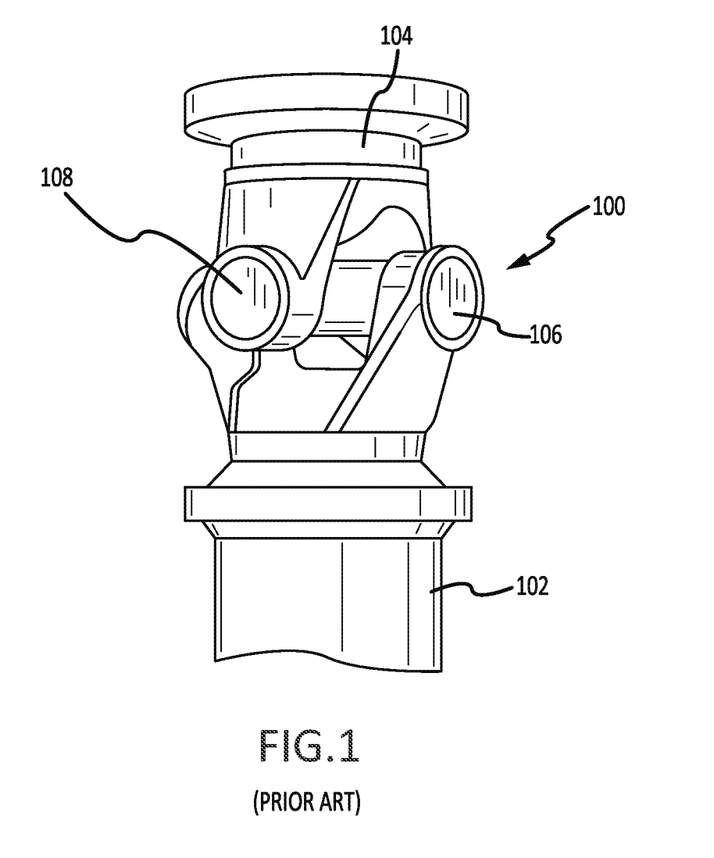
FIG. 1 depicts a prior art hanger connection of a gyratory sifter.

FIG. 1 depicts a universal joint 100 in this type of gyratory sifter. The universal joint 100 connects a shaft 102 to an anchor 104 so that when the screen vibrates, the vibrations that pass to the platform are minimized. The universal joint 100 has a first hinge 106 connected to the shaft 102 that is oriented at 90 degrees with respect to a second hinge 108 connected to the anchor 104. While the universal joint 100 minimizes some vibrations from passing to the platform, the universal joint permits some axial motion that is generated from the vibrations of the screen. Transmitting these axial loads to the platform reduces the efficiency of the gyratory sifter as some of the energy inputted into vibrating the screen is dissipated into the platform.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

While the embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION

Figure 2:
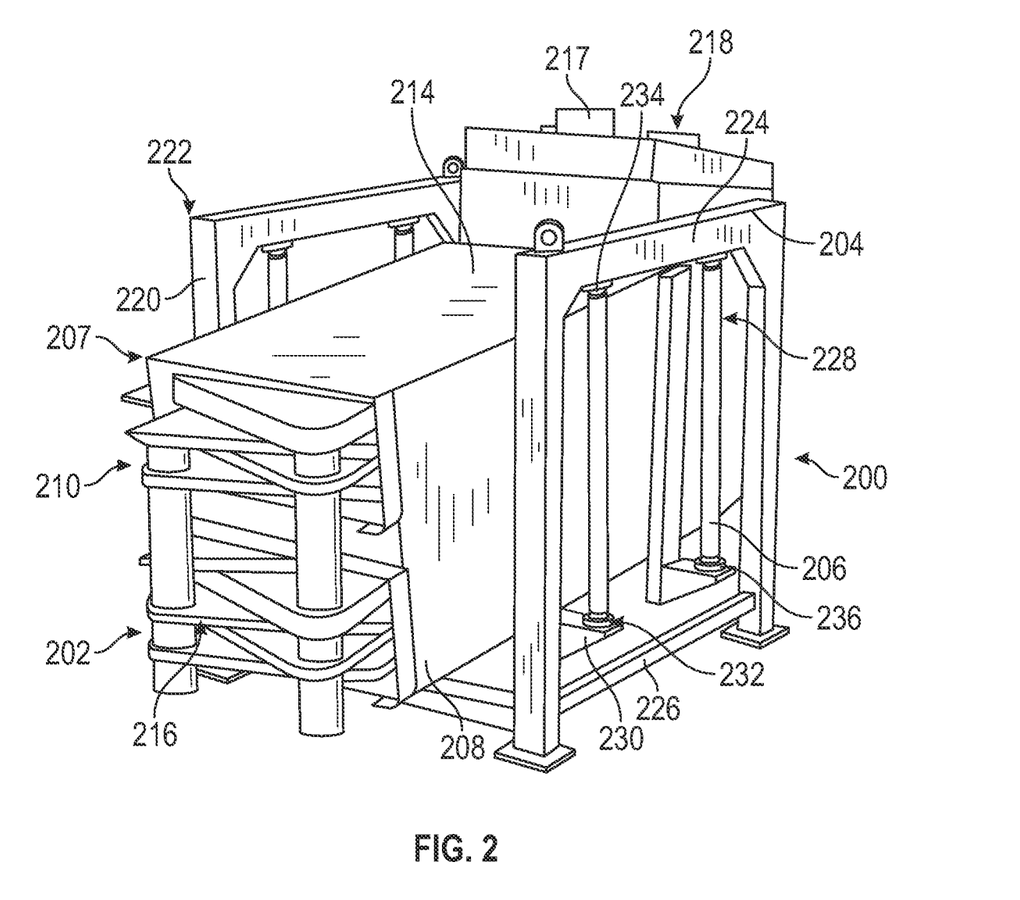
FIG. 2 depicts a perspective view of an example of a vibrational assembly in accordance with the present disclosure.

FIG. 2 depicts a perspective view of an example of a vibrational assembly 200 in accordance with the present disclosure. In some examples, the vibrational assembly 200 is a gyratory sifter. The vibrational assembly 200 may include a screen assembly 202 connected to a platform 204 with a plurality of rod assemblies 206 connecting the screen assembly 202 to the platform 204.

The screen assembly 202 may include a container 207 that has a first side wall 208, a second side wall 210 opposite the first side wall, and a floor that connects the first side wall 208 and the second side wall. In some embodiments, the screen assembly 202 includes a ceiling 214 that is opposite the floor and connects the first side wall 208 and the second side wall. In the illustrated example, a door 216 is incorporated into the container 207 so that a screen can be attached within the container 207. The surface area of the screen is generally aligned with the floor and ceiling 214 of the container 207. The screen includes screen openings which allow aggregate smaller than the screen opening's size to pass through and drop below the screen. In some examples, the screen assembly 202 includes multiple layers of screens with different screen opening sizes. In these examples, as aggregate drops from one layer to the next, the aggregate continues to separate out by size.

An intake 217 may be incorporated into the ceiling 214 of the container 207, one of the first side wall 208 or the second side wall, or another appropriate location of the container. The aggregate may be directed into the container 207 through the intake 217 where the aggregate falls onto the topmost screen and spread out across the surface of the topmost screen. In some cases, the screen is angled slightly downward to facilitate the aggregate spreading across the screen's surface area. As the aggregate comes into contact with the screen, those particles with smaller sizes than the screen's opening may pass through to the screen below or to another surface within the container.

A vibration mechanism, such as an eccentric motor, an unbalanced mass on a driveshaft, a linear actuator, another type of vibration mechanism, or combinations thereof, may be used to vibrate the container 207 to vibrate the screen. As the screen vibrates, the aggregate moves along the length of the screen and aggregate smaller than apertures in the screen moves through the apertures and aggregate larger than the apertures moves along the screen.

In the example of FIG. 2, the container 207 hangs from the platform 204 by the rod assemblies 206. In this example, the rod assemblies 206 are hangers that support the weight of the container 207, and the container 207 is free to gyrate or otherwise move. In alternative examples, the rod assemblies 206 are post assemblies where the rod assemblies 206 connect the container 207 to a platform 204 located, at least in part, underneath the container 207. In either example, the platform 204 may be a frame that is rigidly attached to a support surface on which the platform rests. In some cases, the platform 204 is incorporated into a part of the structure of a building or a heavy object.

In the example of FIG. 2, the platform 204 includes a first pair 218 of upright beams 220 and a second pair 222 of upright beams. Each of the upright beams may be connected to the other upright member of its pair by an upper cross beam 224 and a lower cross beam 226. A first end 228 of each of the rod assemblies 206 may be connected to the upper cross beams 224. The container 207 may include a support member 230 on to which a second end 232 of the rod assembly 206 attaches. In the illustrated example, the four rod assemblies 206 are used to suspend the container 207 off of the support surface. The first pair 218 of rod assemblies 206 may be positioned adjacent to the first side wall 208 of the container 207, and the second pair 222 of rod assemblies 206 may be positioned adjacent to the second side wall 210 of the container 207. First spherical bearing assemblies 234 may connect the first ends 228 of the rod assemblies 206 to the upper cross beams, and second spherical bearing assemblies 236 can connect the second ends 232 of the rod assemblies 206 to the container's support members 230.

Figure 3:
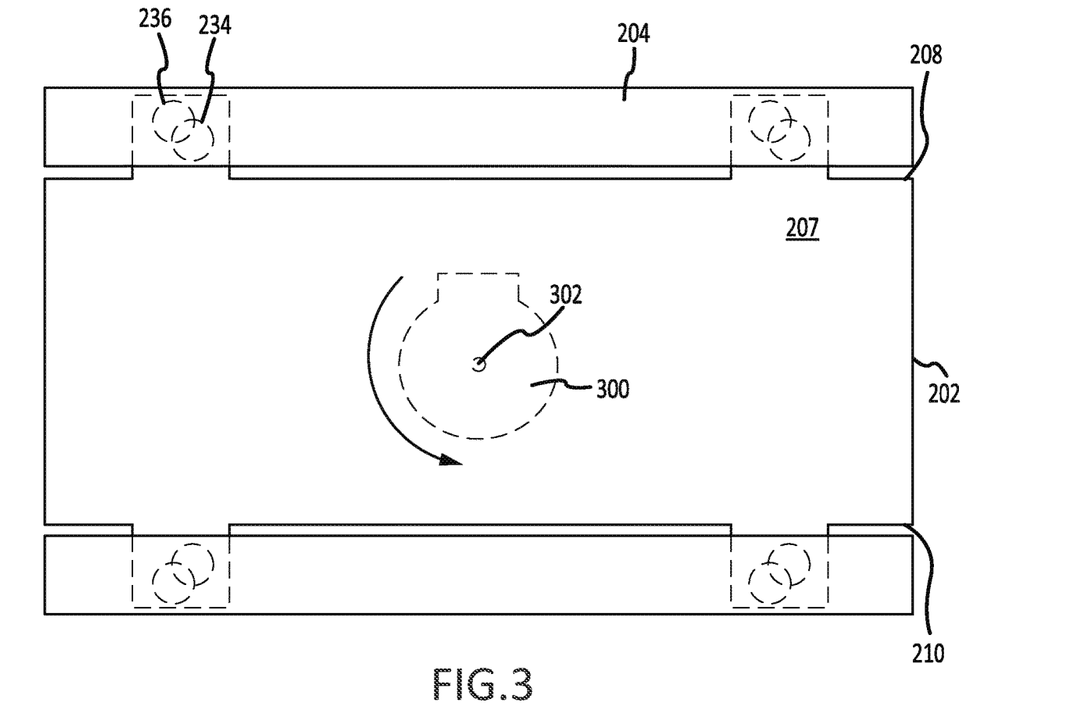
FIG. 3 depicts an example of a top view of a vibrational assembly in accordance with the present disclosure.

FIG. 3 depicts an example of a top view of a vibrational assembly 200 in accordance with the present disclosure. In this example, the container 207 is suspended between upper cross beams of the platform 204. The vibration mechanism is depicted within the container 207 to generate horizontal movement of the container. In the illustrated example, the vibration mechanism includes an eccentric weight 300.

In some examples, the vibration mechanism is attached to a motor (not shown) that may also be disposed within the container. As the motor causes a drive shaft 302 of the vibration mechanism to move the eccentric weight 300, a gyratory motion is induced in the container 207 causing the container 207 to move horizontally along a gyratory path. The first end 228 of the rod assemblies 206 is angularly displaced out of an axial orientation with the second end 232 of the rod assemblies 206 as the container 207 moves. In some examples, the size and speed of the eccentric weight 300 causes the container 207 to constantly change its angular direction. Thus, in the example of FIG. 3, the first spherical bearing assembly 234 is depicted as offset from the second spherical bearing assembly 236. When the eccentric weight 300 is driven, the multiple rod assemblies 206 may permit horizontal movement of the screen assembly 202 and/or container 207 and minimizing axial forces associated with movement of the eccentric weight 300.

Figure 4:
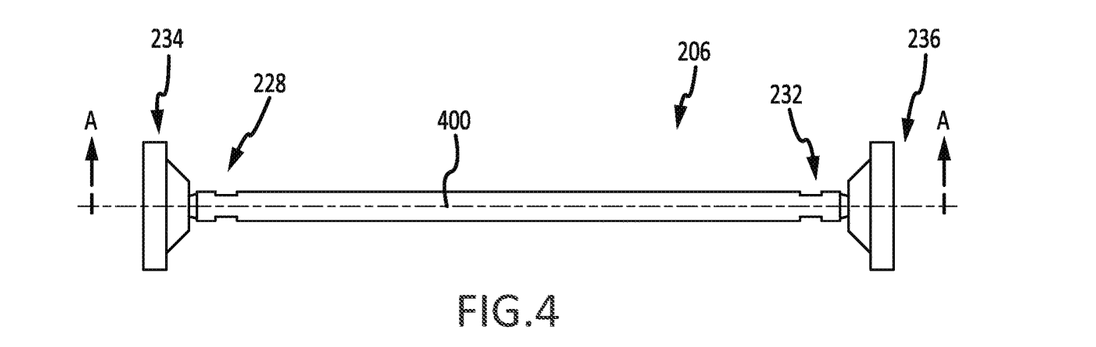
FIG. 4 depicts an example of a rod assembly in accordance with the present disclosure.

FIG. 4 depicts an example of a rod assembly 206 in accordance with the present disclosure. In this example, the rod assembly 206 includes a rod 400. A first spherical bearing assembly 234 is attached to a first end of the rod 400, and a second spherical bearing assembly 236 attached to a second end of the rod 400.

Each of the first spherical bearing assembly 234 and the second spherical bearing assembly 236 may rotate with respect to the rod 400. Further, each of the first spherical bearing assembly 234 and the second spherical bearing assembly 236 may move angularly in any direction within 360 degrees about the ends of the rod 400. The first and second spherical bearing assemblies 234, 236 may include a characteristic permits the rod 400 to move angularly while at least minimizing the axial loads generated by the container's movement.

In the example of FIG. 4, the rod 400 is made of a unitary material and has a fixed length. In alternative examples, the rod 400 is adjustable and has at least two parts that can move axially with respect to each other and can be selectively locked in place at a desired length.

Figure 5:
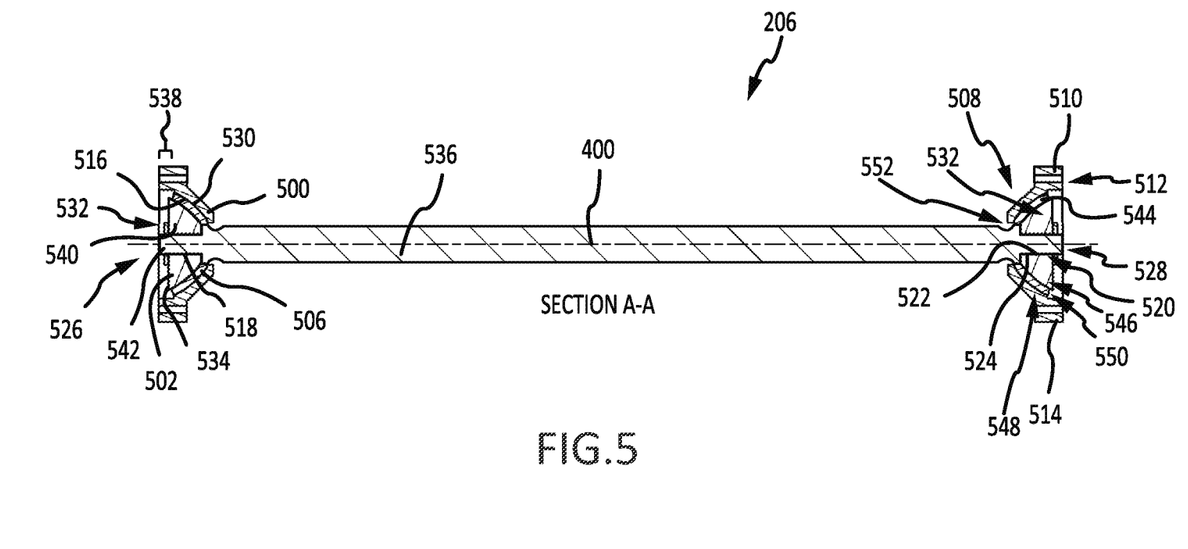
FIG. 5 depicts an example of a cross sectional view of a rod assembly in accordance with the present disclosure.

FIG. 5 depicts an example of a cross sectional view of a rod assembly 206 in accordance with the present disclosure. In this example, each of the first spherical bearing assembly 234 and the second spherical bearing assembly 236 include an outer bearing member 500, an inner bearing member 502 disposed within a cavity 504 defined by the outer bearing member 500, and an elastomeric material 506 disposed between the outer bearing member 500 and the inner bearing member 502. The inner bearing member 502 and the outer bearing member 500 are capable of relative angular rotation with respect to one another.

The outer bearing member 500 may include any appropriate type of shape. The outside surface 508 of the bearing may have a frustoconical shape with a circumferential flange 510 surrounding the portion that defines the cavity 504. Fastener ports 512 may be defined in the circumferential flange 510. Any appropriate type of fastener may be interlocked with the fastener ports 512 to secure the spherical bearing assemblies to the platform or to the screen assembly 202. A distal face 514 of the circumferential flange 510 may contact the platform's surface or the screen assembly's surface when the spherical bearing assembly is fastened through the fastener ports 512.

In some cases, no fastener ports 512 are incorporated into the spherical bearing assemblies. In these types of examples, the spherical bearing assemblies may be attached through a magnetic connection, a connection using clamps, a welded connection, another type of connection, or combinations thereof. In some examples, the circumference of the outer bearing member 500 includes a thread-form that allows the spherical bearing assembly to be threaded into a threaded recess defined in the platform or screen assembly. In this type of example, the outer bearing member 500 may not include a circumferential flange.

In the illustrated example, the outer bearing member 500 has an inner surface 516 with a concave shape that defines the cavity 504. A through hole 518 is also defined in the outer bearing member 500 that connects the inner surface 516 with the outer bearing member's outside surface. At least a portion of the rod 400 is disposed within the through hole 518.

The through hole 518 is wide enough to permit the rod 400 to move angularly to any appropriate swing angle in all directions. In some examples, the through hole 518 is wide enough to permit the rod 400 to angularly move at least 1 degree, at least 2 degrees, at least 5 degrees, at least 10 degrees, at least 15 degrees, at least 20 degrees, at least 25 degrees, at least 30 degrees, at least 45 degrees, at least 65 degrees, another appropriate swing angle, or combinations thereof.

In some cases, the through hole 518 has straight sides. In another embodiment, the through hole 518 has tapered sides where the diameter of the through hole 518 proximate the inner surface 516 of the outer bearing member 500 is narrower than the diameter proximate the outside surface 508 of the outer bearing member 500.

The outer bearing member may be made of any suitable material. A non-exhaustive list of suitable materials may include a metal, a steel, a stainless steel, a hardened plastic, alloys thereof, another type of material, or combinations thereof.

The inner bearing member 502 may include a rod attachment opening 520 that permits the connection of an end of the rod 400 to the inner bearing member 502. In some examples, the rod attachment opening 520 includes a first thread 522 that can threadedly engage a second thread 524 on either a first end 526 of the rod 400 or a second end 528 of the rod 400. While this example has been described with reference to a particular type of connection between the inner bearing member 502 and the rod, any appropriate type of connection may be used. For example, the rod 400 may include a twist-lock feature that permits the rod 400 to be inserted into the rod attachment opening 520 and twisted with respect to the inner bearing member 502 so that the rod's end interlocks with a geometry within the rod attachment opening 520. In another example, the inner bearing member 502 and the rod 400 may be attached through a magnetic connection, a welded connected, a clamped connection, another type of connection, or combinations thereof. In some cases, an external fixture may be used to facilitate the connection between the inner bearing member 502 and the rod 400.

The first end or second end of the rod 400 may be inserted into the rod attachment opening 520, and a portion of the rod 400 may protrude out of the through hole 518 of the outer bearing member 500. The inner bearing member 502 may be rotationally isolated from outer bearing member 500 and may move independently of the outer bearing member 500. Thus, the rod 400 may also be rotationally isolated from the outer bearing member 500 and may move independently of the outer bearing member 500.

In some cases, the elastomeric material 506 is rigidly connected to the outer bearing member 500 and the relative movement is between the inner bearing member 502 and the elastomeric material 506. In other examples, the elastomeric material 506 is rigidly connected to the inner bearing member 502 and the relative movement is between the outer bearing member 500 and the elastomeric material 506. In yet another embodiment, the elastomeric material 506 is rigidly connected to neither the inner bearing member 502 nor the outer bearing member 500 and can move with respect to both the inner bearing member 502 and the outer bearing member 500.

The inner bearing member 502 may include any appropriate shape that permits the rotational and angular movement of the inner bearing member 502 with respect to the outer bearing member 500. In some examples, the inner bearing member 502 includes at least a portion that has a spherical surface 530. For the purposes of this disclosure, the term "spherical" refers generally to resembling a sphere, having a globular shape, having a radius of curvature in all directions, or combinations thereof. In some cases, the spherical surface 530 covers just a portion of the inner bearing member 502. In such an example, the inner bearing member 502 may include a semi-spherical cross section 532. In other examples, less than half of the inner bearing member 502 includes a spherical surface 530. In other examples, more than half of the inner bearing member 502 includes a spherical surface 530.

In the example of FIG. 5, the inner bearing member 502 includes a back side 534 that is opposite to the spherical surface 530. In some cases, the back side 534 includes a generally flat surface. But, in other examples, the back side 534 of the inner bearing member 502 may include any appropriate type of profile. In some cases, the back side 534 is contiguous to the spherical surface 530 of the inner bearing member 502.

Also, in the illustrated example, if the central axis 536 of the rod 400 is perpendicular with the width of the spherical bearing member, the back side 534 of the inner bearing member 502 is off-set at an even axial gap 538 from the distal face 514 of the outer bearing member's circumferential flange. This axial gap 538 provides room for the back side 534 of the inner bearing member 502 to move towards the distal face 514 and/or towards the back end of the spherical bearing member as the inner bearing member 502 angularly moves with the rod 400 in multiple directions.

The semi-spherical cross section of the inner bearing member 502 provides several advantages. One advantage is that the load bearing regions of the inner bearing member 502 have the spherical surface 530 and the back side 534 of the inner bearing member 502 that is not in contact with the elastomeric material 506 does not undergo a more expensive shaping technique to form a spherical surface. Another advantage is that the inner bearing member 502 has less material for the rod 400 to protrude through the back side 534. In those examples where the rod 400 protrudes out of the inner bearing member 502 at the back side 534, the rod 400 may be attached to additional components of the spherical bearing assembly. In one example, an anti-rotation device 540 may be attached to the protruding portion 542 of the rod. The anti-rotation device 540 may prevent or at least minimize the ability of the rod 400 to unthread with the first thread 522 of the rod attachment opening 520.

In one example, the anti-rotation device 540 includes a washer that has teeth or another type of shape that digs into the back side 534 of the inner bearing member 502 that mechanically locks the washer in place when the washer moves with respect to the rod 400 in a direction that would cause the rod 400 and the inner bearing member 502 to unwind. In this type of example, the washer may be placed around the protruding portion 542 of the rod, and a threaded nut may be threaded over the protruding portion 542 and adjacent to the washer so that the washer is held against the inner bearing member's back side 534.

In another example, the protruding portion 542 of the rod 400 may include a cross port in which an anti-rotation pin can be inserted. In this type of example, when the rod 400 rotates relative to the inner bearing member 502, the anti-rotation pin may interlock with the back side 534 of the inner bearing member 502 and restrict their relative movement.

In yet another example, a clinch fastener may be placed over the protruding portion 542 of the rod 400 and be clinched in place. This may be accomplished by applying inward pressure in at least two directions on the clinch fastener so that the clinch fastener and the protruding end of the rod 400 deform. The deformation may also prevent the protruding rod 400 from exiting the back side 534 of the inner bearing member 502. In some cases, the anti-rotation device 540 is permanently attached to the protruding portion 542 of the rod 400. In other examples, the anti-rotation device 540 may be removable for reuse in other spherical bearing assemblies.

While the anti-rotation device 540 has been described with reference to specific examples, any appropriate type of device may be used to prevent the unwinding of the rod 400 with the inner bearing member 502. A non-exhaustive list of anti-rotation devices may include anchor nuts, anti-rotation washers, clinch nuts, anti-rotation pins, other types of anti-rotation fasteners, other type of anti-rotation devices, or combinations thereof.

The elastomeric material 506 may include a cup shape 544. In some examples, the elastomeric material 506 includes a concave side 546 and a convex side 548 separated by an elastomeric material thickness 550. The convex side 548 may be positioned against the inner surface 516 of the outer bearing member 500, and the concave side 546 may be positioned against the spherical surface 530 of the inner bearing member 502. In this example, the elastomeric material 506 may line the inner surface 516 of the outer bearing member 500. A passage 552 may be defined through the elastomeric material thickness 550 from the concave side 546 to the convex side 548.

The elastomeric material 506 may be positioned to absorb axial forces along the length of the rod 400 and permit angular and rotational movement between the inner bearing member 502 and the outer bearing member 500. As the screen assembly 202 gyrates, the screen assembly is caused to move horizontally in a direction that is substantially parallel to a base of the screen assembly 202. In some examples, the effectiveness of the sifting in the screen assembly is maximized when the screen assembly moves only in a horizontal direction without any vertical movement in a direction that is generally perpendicular to the base of the screen assembly 202. As the screen assembly 202 swings in a gyratory trajectory, some axial forces on the rod assembly 206 are generated which results in vertical forces on the screen assembly if the axial forces are not absorbed. The elastomeric material 506 can absorb these axial loads thereby limiting the amount or eliminating altogether the vertical forces on the moving screen assembly.

In some examples, the wider the swing angle of the rod assemblies 206, the greater the vertical forces on the screen assembly. Further, the greater the swing angle, the greater the angular displacement between the inner bearing member 502 and the outer bearing member 500. In some examples, the elastomeric material 506 may cover the entire spherical surface 530 to accommodate the loads imposed by greater swing angles. In other examples, the elastomeric material 506 covers an area that is less than the entire spherical surface 530.

To reduce friction between the inner bearing member 502 and the outer bearing member 500, the inner bearing member 502 and the outer bearing member 500 may include coatings that are made of low friction materials. In some examples, the inner bearing 502 member and/or the outer bearing member 500 may include a fine finish surface to reduce friction between the inner bearing member 502 and the outer bearing member 500. Further, in some examples, the friction between the moving surfaces of the inner bearing 502 and the outer bearing 500 is reduced by having small tolerances that bring the spherical surface 530 and the inner surface 516 as close to a mathematically defined sphere as possible.

In some cases, no lubrication is needed between the inner bearing 502 and the outer bearing 500 of the spherical bearing assemblies. In this examples, the metal components of the spherical bearing assemblies may be separated so that metal is not moving on metal. But, in some examples, a lubrication may be desired to decrease friction and/or reduce a temperature of the spherical bearing assemblies' components during movement.

Figure 6:
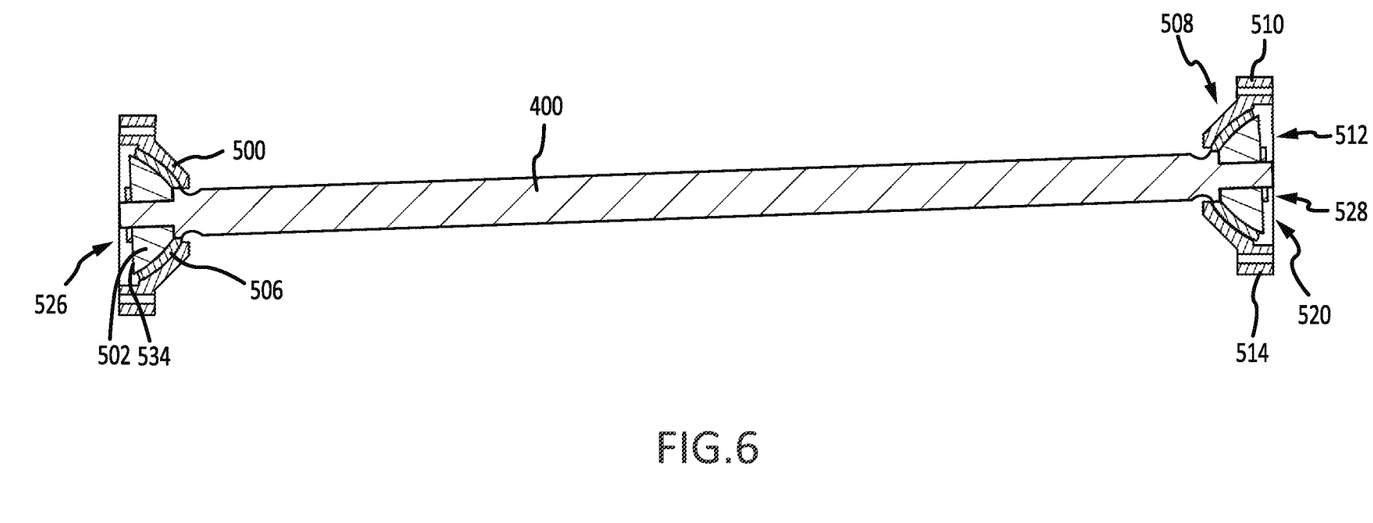
FIG. 6 depicts an example of a cross sectional view of a rod angularly oriented with respect to first and second spherical bearing assemblies disposed on at ends of the rod assembly depicted in FIG. 5.

FIG. 6 depicts an example of a cross sectional view of a rod angularly oriented with respect to the first and second spherical bearing assemblies disposed on at ends of the rod assembly 206. The inner bearing members 502 are angularly displaced with respect to the outer bearing members 500 when the rod 400 is angularly oriented. Further, the axial gap 538 between the back side 534 of the inner bearing member 502 and the distal face 514 of the outer bearing member's circumferential flange 510 is reduced in the direction of the swing and enlarged in the opposing direction. In some cases, when either of the first or second inner bearing members 502 is displaced with respect to the outer bearing member 500 due to the angular orientation of the rod, the other inner bearing member 502 of the other spherical bearing assembly is displaced to the same degree.

Figure 7:
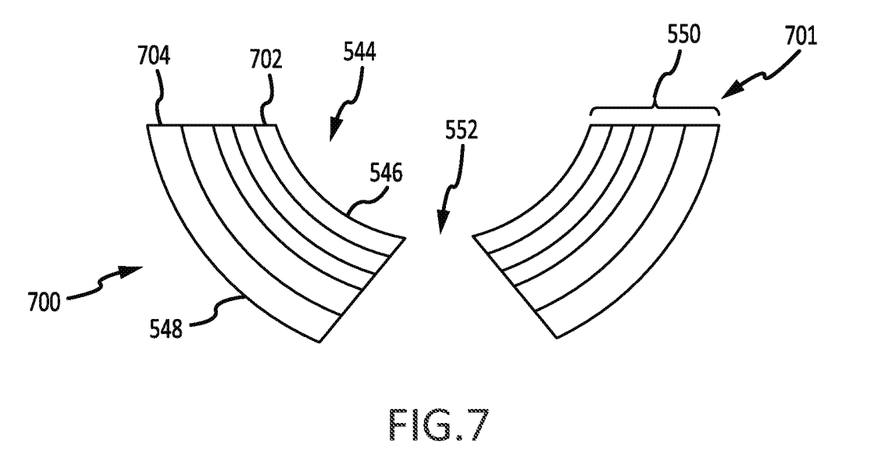
FIG. 7 depicts an example of a cross sectional view of an elastomeric material in accordance with the present disclosure.

FIG. 7 depicts an example of a cross sectional view of an elastomeric material 506 in accordance with the present disclosure. In some examples, the convex surface of the elastomeric material 506 is a first surface adjacent the outer bearing member 500, and the concave surface is a second surface adjacent to the inner bearing member 502. The concave surface may be opposite of the convex surface. The elastomeric material 506 may diverge from the passage 552 at a central location and terminate at a rim 701.

As depicted in the example of FIG. 7, the elastomeric material 506 has a laminate structure 700. In some examples, a concave most layer 702 of the laminate structure 700 include a different hardness than the convex most layer 704. In some examples, the first surface of the elastomeric material 506 has a greater hardness than the second surface. In alternative examples, the second surface of the elastomeric material 506 has a greater hardness than the first surface.

In the example of FIG. 7, the elastomeric material 506 progressively increases in hardness from the convex surface to the concave surface through the elastomeric material thickness. In some cases, each of the layers of the elastomeric material 506 is harder than its' adjacent layer from the convex side 548 to the concave side 546. The concave side 546 has a surface area that is smaller than the convex surface and also experiences less displacement and smaller loads than the convex surface due to its proximity to the inner bearing member 502. Thus, in examples where the elastomeric material 506 is progressively harder towards the concave surface, the elastomeric material 506 becomes progressively softer approaching the convex surface where there is greater displacement. In some examples, absorbing the axial forces may be more efficient when the regions of greater displacement and/or higher loads has a softer hardness.

While the illustrated example depicts a specific number of layers in the laminate structure, any appropriate number of layers may be incorporated into the structure. In one example, the entire thickness of the elastomeric material 506 is a single layer with homogenous properties throughout. In other examples, just a convex layer and a concave layer are incorporated into the laminate structure. In this example, the convex and concave layers may include different properties, such as different hardness, different thicknesses, different friction coefficients, different thermal conductivities, other different characteristics, or combinations thereof. In other examples, more than two layers are incorporated into the laminate structure. In these examples, at least some of the layers may include similar characteristics. In other examples, each of the layers has at least one characteristic that is different than the other layers.

The elastomeric material 506 may be made of any appropriate type of material. In some examples, a non-exhaustive list of elastomeric materials may include rubber, natural polyisoprene, synthetic polyisoprene, polybutadiene, chloroprene rubber, butyl rubber, halogenated butyl rubber, styrene-butadiene rubber, nitrile rubber, hydrogenated nitrile rubber, ethylene propylene rubber, ethylene propylene diene rubber, epichlorohydrin rubber, polyacrylic rubber, silicone rubber, fluorosilicone, rubber, fluoroelastomer, perfluoroelastomer, polyether block amide, chlorosulfonated polyethylene, ethylene-vinyl acetate, thermoplastic elastomers, polysulfide rubber, elastolefin, other types of elastomers, or combinations thereof.

In some embodiments, each of the layers in the laminate structure 700 is an elastomeric material. But, in other examples, at least some of the materials are not elastomeric materials. In some cases, at least one of the layers includes a metal layer and/or a plastic layer. In other examples, where each of the layers in the laminate structure 700 is an elastomeric material, the layers may be secured to one another through any appropriate process. In some examples, each of the elastomeric materials is secured to its adjacent layers with an adhesive. In other examples, the different layers are chemically bonded to each other through a heating process and/or an application of a chemical.

The passage 552 through the elastomeric material 506 has a progressively greater diameter as the passage approaches the convex side 548 of the laminate structure. The diameter of the passage 552 proximate the concave side 546 may be smaller than the diameter of the passage 552 proximate the convex side 548 of the elastomeric material 506.

Figure 8:
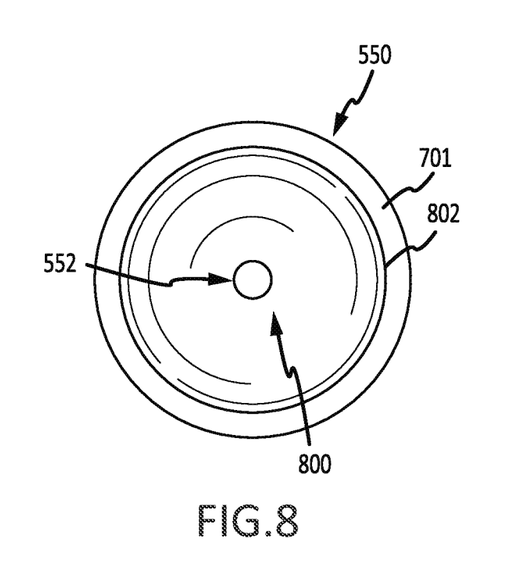
FIG. 8 depicts an example of a concave view of an elastomeric material in accordance with the present disclosure.

FIG. 8 depicts an example of a concave view of an elastomeric material 506 in accordance with the present disclosure. In this example, the elastomeric material 506 defines a concavity contiguous with an inner edge 802 of the rim 701. The passage 552 is defined in a central location 800 of the elastomeric material 506.

Figure 9:
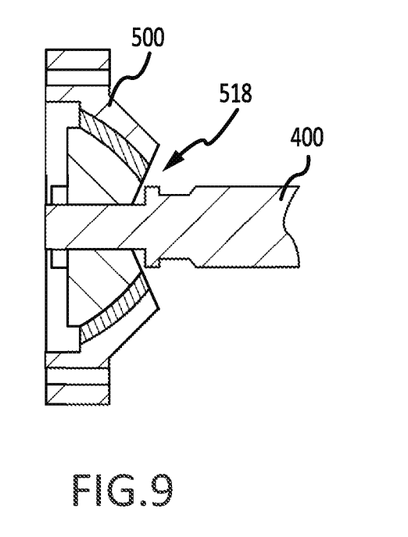
FIG. 9 depicts an example of a spherical bearing assembly with a wide through hole in accordance with the present disclosure.

FIG. 9 depicts an example of a spherical bearing assembly with a wide through hole 518 is also defined in the outer bearing member 500 in accordance with the present disclosure. In this example, a spherical bearing assembly includes a through hole 518 with a large tapering diameter. This wider through hole 518 in the outer bearing member 500 may accommodate a wider swing angle of the rod assembly 206. In some examples, the diameter of the rod 400 is less than 50 percent of the diameter of the through hole 518. In other examples, the diameter of the rod 400 is less than 70 percent of the diameter of the through hole 518.

Figure 10:
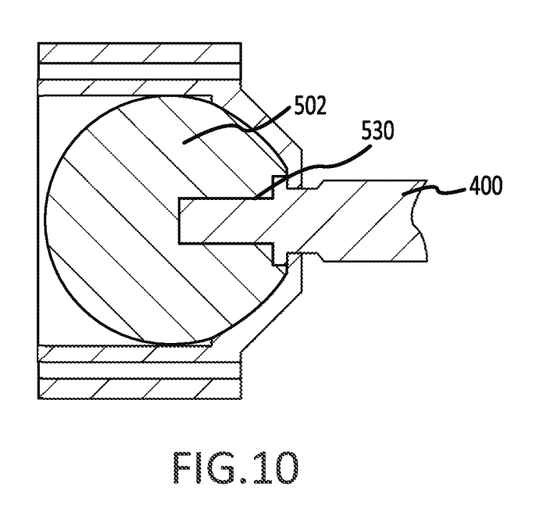
FIG. 10 depicts an example of a spherical bearing assembly with an inner bearing member having a spherical cross section in accordance with the present disclosure.

FIG. 10 depicts an example of a spherical bearing assembly with an inner member having a spherical cross section in accordance with the present disclosure. In this example, the first end of the rod 400 is secured within the rod attachment opening 520 of the inner bearing member 502, and the rod 400 does not protrude out the back side of the inner member bearing 502. Additionally, the spherical cross section of the inner bearing member 502 may accommodate a wider range of swing angles. In this example, the fastener ports 512 are depicted as having a longer length than in other examples. In some embodiments, the outer bearing member 500 may be wider and may taper down to a smaller cross section where the fastener ports 512 are located to accommodate a short types of fasteners.

Figure 11:
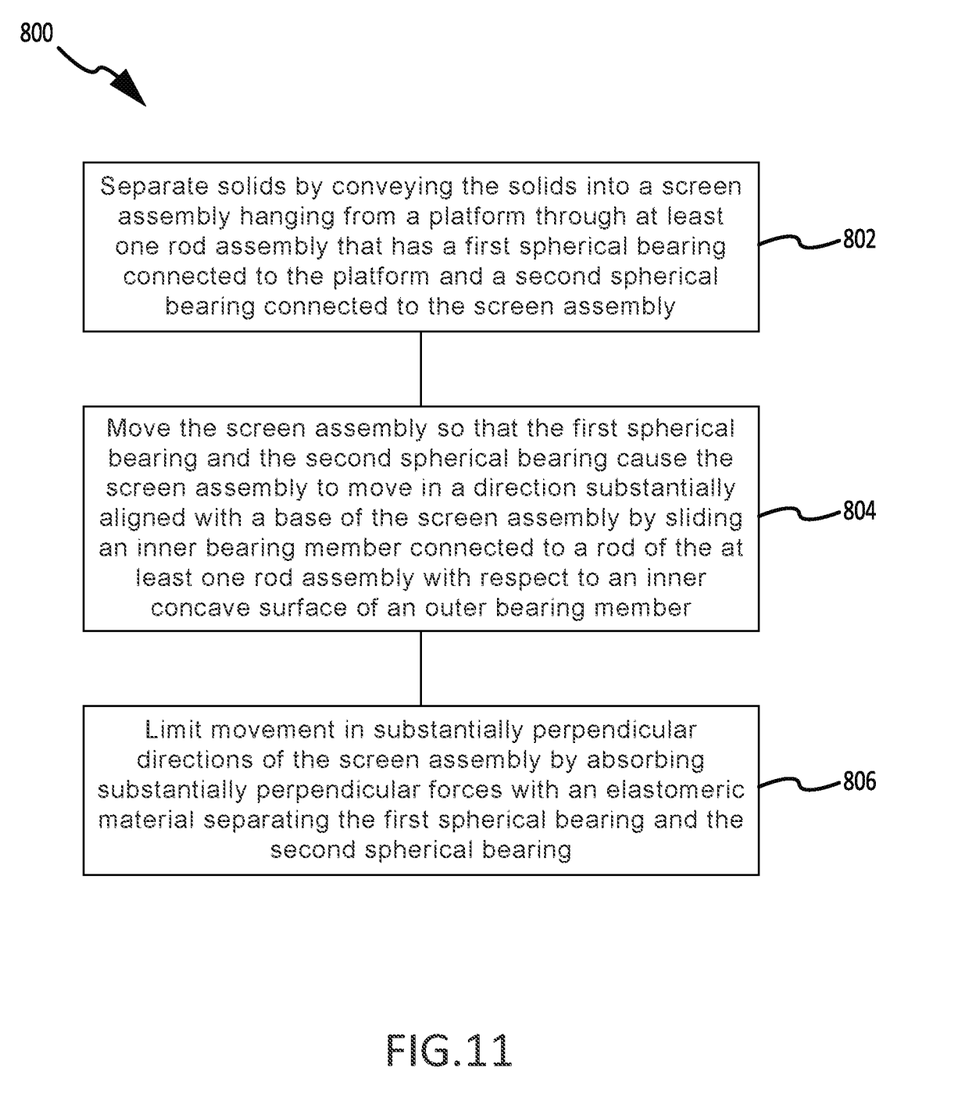
FIG. 11 depicts an example of a method of separating solids in accordance with the present disclosure.

FIG. 11 depicts an example of a method 800 of separating solids. In this example, the method 800 includes separating 802 solids by conveying the solids into a screen assembly hanging from a platform through at least one rod assembly that has a first spherical bearing connected to the platform and a second spherical bearing connected to the screen assembly, moving 804 the screen assembly so that the first spherical bearing and the second spherical bearing cause the screen assembly to move in a direction substantially aligned with a base of the screen assembly by sliding an inner bearing member connected to a rod of the at least one rod assembly with respect to an inner concave surface of an outer bearing member, and limiting 806 movement in substantially perpendicular directions of the screen assembly by absorbing substantially perpendicular forces with an elastomeric material separating the first spherical bearing and the second spherical bearing.

At block 802, the solids are conveyed into a screen assembly. In some examples, the screen assembly may be the type of screen assembly depicted in FIGS. 2 and 3, but other types of screen assemblies may be used in accordance with the principles described in the present disclosure. At block 804, the screen assembly may be moved in accordance with the principles described above in conjunction with an eccentric weight or another movement mechanism. In some cases, the screen assembly is gyrated, shaken, or otherwise moved. At block 806, the movement that is substantially perpendicular to the base of the screen assembly may be limited due to the elastomeric material absorbing the loads directed across the space between the inner bearing member and the outer bearing member. As a result, the movement of the screen assembly may be substantially level. In some cases, substantially perpendicular movements of the screen assembly decrease the rate of separating. Thus, by removing the substantially perpendicular movements of the screen assembly more solids may be separated in within a set period of time thereby increasing the effectiveness of the separating the solids. Further, in those examples where the inner bearing member and the outer bearing member are made of metal, separating the inner bearing member and the outer bearing member with an elastomeric material reduces movement at metal to metal contact points. As a result, the spherical bearings of the rod assemblies may reduce and/or eliminate need for adding lubricates to the spherical bearings and thereby reduce and/or eliminate a need for maintenance.

In some examples, an apparatus includes an outer bearing member defining a cavity and an inner bearing member disposed within the cavity. The inner bearing member includes a spherical surface and a rod attachment opening defined in the spherical surface. The apparatus also includes an elastomeric material disposed within the cavity adjacent to the spherical surface.

In some examples, an apparatus includes a rod, a first spherical bearing assembly attached to a first end of the rod; and a second spherical bearing assembly attached to a second end of the rod. Each of the first spherical bearing assembly and the second spherical bearing assembly include an outer bearing member, an inner bearing member disposed within a cavity defined by the outer bearing member, and an elastomeric material disposed between the outer bearing member and the inner bearing member. The inner bearing member and the outer bearing member are capable of relative angular rotation with respect to each other.

In some examples, an apparatus includes a screen assembly, an eccentric weight disposed within the screen assembly, and multiple rod assemblies connected to the screen assembly. Each of the multiple rod assemblies includes a first end, a second end connected by a rod, a first spherical bearing assembly located at the first end and connected to the screen assembly, and a second spherical bearing assembly located at the second end. Each of the first spherical bearing assembly and the second spherical bearing assembly include an outer bearing member forming an inner surface, an inner bearing member disposed within a cavity defined by the inner surface, and an elastomeric material disposed between the inner surface of the outer bearing member and the inner bearing member.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the present systems and methods and their practical applications, to thereby enable others skilled in the art to best utilize the present systems and methods and various embodiments with various modifications as may be suited to the particular use contemplated.

Unless otherwise noted, the terms "a" or "an," as used in the specification and claims, are to be construed as meaning "at least one of" In addition, for ease of use, the words "including" and "having," as used in the specification and claims, are interchangeable with and have the same meaning as the word "comprising." In addition, the term "based on"

as used in the specification and the claims is to be construed as meaning "based at least upon."

What is claimed is:

1. An apparatus, comprising:
   a screen assembly;
   at least one rod assembly connected to the screen assembly, the at least one rod assembly including:
      a rod;
      a first spherical bearing assembly attached to a first end of the rod; and
      a second spherical bearing assembly attached to a second end of the rod;
      wherein each of the first spherical bearing assembly and the second spherical bearing assembly includes:
         an outer bearing member;
         an inner bearing member disposed within a cavity defined by the outer bearing member; and
         an elastomeric material disposed between the outer bearing member and the inner bearing member;
         wherein the inner bearing member and the outer bearing member are capable of relative angular rotation with respect to each other.

2. The apparatus of claim 1, wherein the rod is rotationally isolated from the outer bearing member.

3. The apparatus of claim 1, wherein the elastomeric material lines an inner surface of the outer bearing member.

4. The apparatus of claim 1, wherein the elastomeric material further includes:
   a convex surface; and
   a concave surface separated by an elastomeric material thickness;
   wherein the elastomeric material progressively increases in hardness from the concave surface to the convex surface through the elastomeric material thickness.

5. The apparatus of claim 1, wherein the elastomeric material further includes:
   a first surface adjacent the outer bearing member; and
   a second surface adjacent to the inner bearing member;
   wherein the first surface includes a greater hardness than the second surface.

6. The apparatus of claim 1, wherein the elastomeric material is positioned to absorb axial forces along a length of the rod while permitting angular and rotational movement between the inner bearing member and the outer bearing member.

7. The apparatus of claim 1, wherein the at least one rod assembly is connected to a platform, and the screen assembly hangs from the at least one rod assembly.

8. A method, comprising:
   separating solids by conveying the solids into a screen assembly hanging from a platform through at least one rod assembly that has a first spherical bearing connected to the platform and a second spherical bearing connected to the screen assembly;
   moving the screen assembly so that the first spherical bearing and the second spherical bearing cause the screen assembly to move in a direction substantially aligned with a base of the screen assembly by sliding an inner bearing member connected to a rod of the at least one rod assembly with respect to an inner concave surface of an outer bearing member; and
   limiting movement in substantially perpendicular directions of the screen assembly by absorbing substantially perpendicular forces with an elastomeric material separating the outer bearing member and the inner bearing member.

9. The method of claim 8, wherein moving the screen assembly includes gyrating the screen assembly.

10. The method of claim 8, wherein the elastomeric material has a first surface adjacent the outer bearing member that has a first hardness that is greater than a second hardness of a second surface adjacent to the inner bearing member.

* * * * *